US009068615B2

(12) United States Patent
Kuno et al.

(10) Patent No.: US 9,068,615 B2
(45) Date of Patent: Jun. 30, 2015

(54) SPRING HAVING EXCELLENT CORROSION FATIGUE STRENGTH (75) Inventors: Takanori Kuno, Nagoya (JP); Masami Wakita, Nagoya (JP)

(73) Assignee: CHUO HATSUJO KABUSHIKI KAISHA, Nagoya-Shi (JP)

( * ) Notice: Subject to any disclaimer, the term of this patent is extended or adjusted under 35 U.S.C. 154(b) by 197 days.

(21) Appl. No.: 13/978,321

(22) PCT Filed: Aug. 23, 2011

(86) PCT No.: PCT/JP2011/068916
§ 371 (c)(1),
(2), (4) Date: Jul. 3, 2013

(87) PCT Pub. No.: WO2012/093506
PCT Pub. Date: Jul. 12, 2012

(65) Prior Publication Data
US 2013/0285299 A1 Oct. 31, 2013

(30) Foreign Application Priority Data

Jan. 6, 2011 (JP) ................................. 2011-001524

(51) Int. Cl.
F16F 1/06 (2006.01)
F16F 1/02 (2006.01)
(Continued)

(52) U.S. Cl.
CPC . *F16F 1/021* (2013.01); *C21D 1/25* (2013.01); *C21D 7/06* (2013.01); *C21D 9/02* (2013.01); *C21D 2211/001* (2013.01); *C21D 2211/008* (2013.01); *C22C 38/00* (2013.01);
(Continued)

(58) Field of Classification Search
CPC ...... F16F 1/021; F16F 1/04; C21D 2211/001; C21D 2211/008; C21D 1/25; C21D 38/42; C22C 38/04
USPC ......... 267/166, 2, 33–35, 155–157, 286–289, 267/195; 148/320–335, 580, 598
See application file for complete search history.

(56) References Cited

U.S. PATENT DOCUMENTS 4,448,617 A 5/1984 Yamamoto et al.
4,544,406 A 10/1985 Yamamoto et al.
(Continued)

FOREIGN PATENT DOCUMENTS

JP H01191745 A 8/1989
JP 03-037434 A 2/1991
(Continued)

OTHER PUBLICATIONS

Office Action from the Japanese Patent Office mailed Nov. 19, 2013 in related JP application No. 2009-225423, including English translation of prior art rejections.
(Continued)

*Primary Examiner* — Pamela Rodriguez
(74) *Attorney, Agent, or Firm* — J-Tek Law PLLC; Jeffrey D. Tekanic; Scott T. Wakeman (57) ABSTRACT A spring has a Rockwell hardness of HRC 53 to HRC 56 and a dislocation density ρ ($cm^{-2}$) that satisfies the formula $\rho \geq 1.4 \times 10^{11} \times H - 6.7 \times 10^{12}$ in the Rockwell hardness range of HRC 53 to HRC 56, in which H is the Rockwell hardness. The spring also has a prior austenite grain size number of 10 or higher.

20 Claims, 2 Drawing Sheets (51) Int. Cl.

| | |
|---|---|
| *C21D 1/25* | (2006.01) |
| *C21D 7/06* | (2006.01) |
| *C21D 9/02* | (2006.01) |
| *C22C 38/00* | (2006.01) |
| *C22C 38/02* | (2006.01) |
| *C22C 38/04* | (2006.01) |
| *C22C 38/42* | (2006.01) |
| *C22C 38/44* | (2006.01) |
| *C22C 38/46* | (2006.01) |
| *C22C 38/50* | (2006.01) |
| *C22C 38/54* | (2006.01) |
| *F16F 1/04* | (2006.01) |

(52) U.S. Cl.
CPC ............... *C22C 38/02* (2013.01); *C22C 38/04* (2013.01); *C22C 38/42* (2013.01); *C22C 38/44* (2013.01); *C22C 38/46* (2013.01); *C22C 38/50* (2013.01); *C22C 38/54* (2013.01); *F16F 1/04* (2013.01)

(56) References Cited

U.S. PATENT DOCUMENTS

| | | | |
|---|---|---|---|
| 5,009,843 | A | 4/1991 | Sugimoto et al. |
| 5,183,634 | A | 2/1993 | Abe et al. |
| 5,225,008 | A | 7/1993 | Koyama et al. |
| 5,258,082 | A | 11/1993 | Koyama et al. |
| 5,286,312 | A | 2/1994 | Shimotsusa et al. |
| 5,508,002 | A | 4/1996 | Kawaguchi et al. |
| 5,575,973 | A | 11/1996 | Choi et al. |
| 5,846,344 | A | 12/1998 | Kawaguchi et al. |
| 5,863,358 | A | 1/1999 | Krzysztalowicz |
| 5,897,717 | A | 4/1999 | Hashimura et al. |
| 6,017,641 | A | 1/2000 | Aoki et al. |
| 6,027,577 | A | 2/2000 | Mikura et al. |
| 6,193,816 | B1 | 2/2001 | Nakano et al. |
| 6,375,174 | B2 | 4/2002 | Hasegawa et al. |
| 6,406,565 | B1 | 6/2002 | Hashimura et al. |
| 6,543,757 | B2 | 4/2003 | Imaizumi |
| 6,544,360 | B1 | 4/2003 | Tange et al. |
| 6,550,301 | B2 | 4/2003 | Hasegawa |
| 6,616,131 | B2 | 9/2003 | Imaizumi |
| 6,648,996 | B2 | 11/2003 | Hasegawa |
| 6,712,346 | B2 | 3/2004 | Imaizumi |
| 6,779,564 | B2 | 8/2004 | Hasegawa et al. |
| 6,836,964 | B2 | 1/2005 | Hasegawa et al. |
| 7,407,555 | B2 | 8/2008 | Yoshikawa et al. |
| 7,597,768 | B2 | 10/2009 | Suda et al. |
| 7,615,186 | B2 | 11/2009 | Suda et al. |
| 7,699,943 | B2 | 4/2010 | Nakano et al. |
| 7,776,440 | B2 | 8/2010 | Kunita et al. |
| 8,328,169 | B2 | 12/2012 | Kuno et al. |
| 8,349,095 | B2 | 1/2013 | Nakano et al. |
| 2005/0173028 | A1 | 8/2005 | Suda et al. |
| 2006/0060269 | A1 | 3/2006 | Nakano et al. |
| 2006/0169367 | A1 | 8/2006 | Yuse et al. |
| 2006/0196584 | A1 | 9/2006 | Kochi et al. |
| 2006/0201588 | A1 | 9/2006 | Suda et al. |
| 2006/0225819 | A1 | 10/2006 | Yoshihara |
| 2007/0163680 | A1 | 7/2007 | Suda et al. |
| 2007/0256765 | A1 | 11/2007 | Kimura et al. |
| 2007/0267112 | A1 | 11/2007 | Yoshikawa et al. |
| 2008/0163957 | A1 | 7/2008 | Brady et al. |
| 2008/0271824 | A1 | 11/2008 | Fujino et al. |
| 2008/0308195 | A1 | 12/2008 | Yoshihara et al. |
| 2009/0020189 | A1 | 1/2009 | Yoshihara et al. |
| 2009/0020195 | A1 | 1/2009 | Kubota et al. |
| 2009/0079246 | A1 | 3/2009 | Okura et al. |
| 2009/0114318 | A1 | 5/2009 | Arai et al. |
| 2009/0174129 | A1 | 7/2009 | Izumida et al. |
| 2009/0205753 | A1 | 8/2009 | Hashimura et al. |
| 2009/0283181 | A1 | 11/2009 | Suda et al. |
| 2009/0293998 | A1 | 12/2009 | Fujino et al. |
| 2010/0034691 | A1 | 2/2010 | Yoshihara |
| 2010/0175795 | A1 | 7/2010 | Choi et al. |
| 2010/0224287 | A1 | 9/2010 | Kochi et al. |
| 2011/0074076 | A1 | 3/2011 | Kuno et al. |
| 2011/0074077 | A1 | 3/2011 | Kuno et al. |
| 2011/0074078 | A1 | 3/2011 | Nakano et al. |
| 2011/0074079 | A1 | 3/2011 | Nakano et al. |
| 2011/0303327 | A1 | 12/2011 | Yoshihara et al. |
| 2013/0008566 | A1 | 1/2013 | Suzuki et al. |

FOREIGN PATENT DOCUMENTS

| | | |
|---|---|---|
| JP | H0578785 A | 3/1993 |
| JP | H05-195153 A | 8/1993 |
| JP | 5-271879 | 10/1993 |
| JP | H07-179985 A | 7/1995 |
| JP | H07173577 A | 7/1995 |
| JP | 7-292435 A | 11/1995 |
| JP | H10287958 A | 10/1998 |
| JP | H11241143 A | 9/1999 |
| JP | 2000-282176 | 10/2000 |
| JP | 2000326036 A | 11/2000 |
| JP | 2001082518 A | 3/2001 |
| JP | 2001-220650 | 8/2001 |
| JP | 2003105498 A | 4/2003 |
| JP | 2003-147479 | 5/2003 |
| JP | 2005-29870 A | 2/2005 |
| JP | 2006291291 A | 10/2006 |
| JP | 2007063584 A | 3/2007 |
| JP | 2007224413 A | 9/2007 |
| JP | 2008133539 A | 6/2008 |
| JP | 2008-261055 | 10/2008 |
| WO | 2004085685 A | 10/2004 |
| WO | 2006022009 A | 3/2006 |
| WO | 2007114491 A | 10/2007 |

OTHER PUBLICATIONS

Office Action from the Japanese Patent Office mailed Nov. 19, 2013 in related JP application No. 2009-225424, including English translation of prior art rejections.

English translation of International Preliminary Report on Patentability for parent application No. PCT/JP2011/068916.

Office Action from the Japanese Patent Office mailed Dec. 11, 2013 in related JP application No. 2010-009072, including English translation of prior art rejection.

Office Action mailed Mar. 24, 2014 in related U.S. Appl. No. 12/892,434.

Office Action from the Japanese Patent Office mailed Dec. 17, 2013 in related JP application No. 2010-009072, including English translation of prior art rejection.

Final Office Action from the Japanese Patent Office mailed Mar. 4, 2014 in related JP application No. 2010-009072, including English translation of prior art rejection.

Office Action mailed Nov. 19, 2013 for related Japanese patent application No. 2009-225422, including English translation of prior art rejections.

Final Office Action mailed Nov. 16, 2013 for related U.S. Appl. No. 12/892,439.

Non-final Office Action mailed Sep. 11, 2013 for related U.S. Appl. No. 12/892,434.

English translation of International Search Report for parent application No. PCT/JP2011/068916.

SPRING HAVING EXCELLENT CORROSION FATIGUE STRENGTH

CROSS-REFERENCE

This application is the US national stage of International Patent Application No. PCT/JP2011/068916 filed on Aug. 23, 2011, which claims priority to Japanese Patent Application No. 2011-001524 filed on Jan. 6, 2011, the contents of which are hereby incorporated by reference into the present application, in their entirety.

TECHNICAL FIELD

The present application relates to a spring. For example, in certain aspects the present application relates to a spring having excellent corrosion fatigue strength while having high strength.

BACKGROUND ART

In recent years, there have been demands for springs of high strength. In general, when seeking to increase the strength of a spring, there is a tendency for the toughness and corrosion fatigue strength, and the like, to deteriorate. Japanese Patent Application Publication No. 2008-261055 discloses a spring having a prior austenite average grain size D of not more than 20 μm, and an average martensite lath length of not more than 30% of the prior austenite average grain size D. Japanese Patent Application Publication No. 2008-261055 states that a spring having characteristics of this kind has high strength and also has high toughness. In the description given below, Japanese Patent Application Publication No. 2008-261055 is called Patent Document 1.

SUMMARY OF THE INVENTION

Even in the case of the spring described in Patent Document 1,, the characteristics required of a spring are not necessarily satisfied adequately. In particular, a spring which is used in a vehicle suspension apparatus, or the like, is required to have high durability even in environments where the spring is liable to corrode. In the description given below, the durability of a spring in a state where the spring has corroded is called the "corrosion fatigue strength". A repeat corrosion fatigue test is known as a test method for measuring the level of corrosion fatigue strength. The repeat corrosion fatigue test involves creating a weak part in one portion of the spring, and then applying a repeated load to the spring in an environment which corrodes the spring. In a repeat corrosion fatigue test, the level of the corrosion fatigue strength is judged by the number of repetitions that have been performed when failure of the spring occurs. In fields where high corrosion fatigue strength is demanded, springs are required to show no failure even after the repeat corrosion fatigue strength has been carried out 40,000 times. It is an object of the technology disclosed in the present specification to provide a spring having excellent corrosion fatigue strength, which also has high strength.

The technology disclosed in the present specification provides a spring which does not fail even after carrying out a repeat corrosion fatigue test 40,000 times, while having high strength with a Rockwell hardness of HRC 53 to 56, by setting the dislocation density and the prior austenite grain size of the steel material used to make the spring, to prescribed conditions.

The spring disclosed in the present specification has a Rockwell hardness of HRC 53 to HRC 56. Furthermore, when the Rockwell hardness is H, the spring has a dislocation density $\rho$ ($cm^{-2}$) which satisfies Formula (1) below in a Rockwell hardness range of HRC 53 to HRC 56, with a prior austenite grain size number being not less than No. 10.

$$\rho \geq 1.4 \times 10^{11} \times H - 6.7 \times 10^{12} \tag{1}$$

Conventionally, the prior austenite grain size (or the prior austenite grain diameter), or the dislocation density, have been adjusted. However, if only the prior austenite grain size or the only the dislocation density is adjusted, then a high-strength spring (a spring having a Rockwell hardness of HRC 53 to HRC 56) which passes 40,000 repeat corrosion fatigue tests could not have been obtained. For example, with a spring having the Rockwell hardness of HRC 55, even when the prior austenite grain side number is not less than No. 10, the spring does not pass 40,000 repeat corrosion fatigue tests unless the dislocation density is not less than $1.0 \times 10^{12}$. On the other hand, even when the dislocation density is not less than $10 \times 10^{12}$, the spring does not pass 40,000 repeat corrosion fatigue tests if the prior austenite grain size number is less than No. 10. In other words, a spring having the Rockwell hardness of HRC 55 only passes 40,000 repeat corrosion fatigue tests if the prior austenite grain size number is not less than No. 10 and the dislocation density is not less than $1.0 \times 10^{12}$. The present inventors discovered the conditions described above by carrying out various studies of the relationship between the prior austenite grain size and the dislocation density. Accordingly, the present inventors successfully obtained a spring which does not fail even when a repeat corrosion fatigue test is performed 40,000 times.

The dislocation density of the spring is substantially proportional to the Rockwell hardness of the spring. In the Rockwell hardness range from HRC 53 to HRC 56, if the actual dislocation density is not less than the dislocation density $\rho$ obtained from the calculation formula in Formula (2) below, then conditions relating to a dislocation density for passing the corrosion fatigue test are satisfied. For example, if 55 is substituted for H (the Rockwell hardness HRC) in Formula (2) below, then the dislocation density $\rho$ is $1.0 \times 10^{12}$. In other words, the relationship between the Rockwell hardness and the dislocation density was researched for springs of different steel types which passed 40,000 repeat corrosion fatigue tests, and Formula (2) below is a calculation formula obtained from the steel type which yielded the smallest value for the dislocation density $\rho$. Therefore, if the actual dislocation density satisfies Formula (1) above, then the conditions relating to the dislocation density for passing the corrosion fatigue test are satisfied. By using Formula (1) described above, it is possible to judge whether or not the spring passes 40,000 repeat corrosion fatigue tests, in the Rockwell hardness range of HRC 53 to HRC 56.

$$\rho = 1.4 \times 10^{11} \times H - 6.7 \times 10^{12} \tag{2}$$

Here, the repeat corrosion fatigue test will be described. The reason that a spring breaks due to corrosion fatigue is because a fine hole (pit) occurs in the surface of the spring, due to corrosion, (called a "corrosion pit" below), and the stress concentrates in this corrosion pit. It is difficult to suppress the occurrence of corrosion pits in a spring. Therefore, it is desirable to have a spring in which the fatigue strength does not decline even if the corrosion pit occurs. The corrosion fatigue strength of the spring is a numerical value obtained by a repeat corrosion fatigue test. More specifically, the corrosion fatigue test is carried out repeatedly and the corrosion fatigue strength of the spring steel can be evaluated by the number of repetitions until the spring breaks. The details of the corrosion fatigue test are described hereinafter.

The spring disclosed in the present specification may include tempered martensite, and may also include not less than 2.1% and not more than 2.4% of silicon (Si), by mass percentage. If the amount of silicon is adjusted to the range stated above, then it is possible to adjust the spring to a desired strength by quenching and tempering. Typically, if the amount of silicon is adjusted to the range stated above, it is possible to adjust the Rockwell hardness of the spring readily to HRC 53 to HRC 56. The "tempered martensite" referred to in the present specification means material which has been transformed from an austenite structure to a martensite structure, by heating the spring steel to a high temperature and then cooling rapidly, and which has then been heated to a prescribed temperature (a temperature below that at which transformation into austenite occurs) and then cooled.

In the spring disclosed in the present specification, of carbides contained in the tempered martensite, the number of carbides having a minimum length less than 15 nm may be set to not more than 40% of the total number of carbides. The "minimum length" referred to in the present specification means the length of a shortest edge of a rectangular shape traced to make contact with the outer edges of the carbide. If the carbide has a spherical shape, then the diameter of the sphere corresponds to the "minimum length". If the carbide has a needle shape, then the thickness (width) of the carbide corresponds to the "minimum length".

The spring disclosed in the present specification may contain, by mass percentage, not less than 0.35% and not more than 0.55% of carbon, not less than 0.20% and not more than 1.50% of manganese, and not less than 0.10% and not more than 1.50% of chromium, and may also contain one or two or more elements selected from nickel, molybdenum and vanadium, respective mass percentages thereof being not less than 0.40% and not more than 3.00% in the case of nickel, not less than 0.05% and not more than 0.50% in the case of molybdenum, and not less than 0.05% and not more than 0.50% in the case of vanadium, the remainder consisting of iron or unavoidable impurities.

Moreover, the spring disclosed in the present specification may contain not less than 0.40% and not more than 0.50% of manganese. Furthermore, the spring disclosed in the present specification may contain not less than 0.50% and not more than 0.60% of nickel.

MODE(S) FOR CARRYING OUT THE INVENTION

By suitably adjusting a spring dislocation density and a prior austenite grain size, it is possible to improve corrosion fatigue strength of a spring. By improving the corrosion fatigue strength of the spring, it is possible to obtain a spring which does not fail, even if repeat corrosion fatigue test is carried out 40,000 times. In other words, when a Rockwell hardness of the spring is in a range of HRC 53 to HRC 56, then Formula (1) below is satisfied, and by setting the prior austenite grain size number to not less than No. 10, it is possible to obtain a spring which passes 40,000 repeat corrosion fatigue tests. For example, Formula (1) below can be used to judge whether or not the dislocation density of a spring having a Rockwell hardness of HRC 55 is equal to or greater than $1.0 \times 10^{12}$. If Formula (1) below is satisfied, the dislocation density of a spring having a Rockwell hardness of HRC 55 is not less than $1.0 \times 10^{12}$. If Formula (1) below is not satisfied, the dislocation density of a spring having a Rockwell hardness of HRC 55 is less than $1.0 \times 10^{12}$. The test method involved in the repeat corrosion fatigue test is described below.

$$\rho \geq 1.4 \times 10^{11} \times H - 6.7 \times 10^{12} \tag{1}$$

The Formula (1) described above is a formula which is derived by varying the Rockwell hardness and calculating the dislocation density for each Rockwell hardness. The details of this are described hereinafter.

Preferably, the steel material from which the spring is made contains tempered martensite. In this case, by adjusting the silicon contained in the steel to a mass percentage of not less than 2.1% and not more than 2.4%, then it is possible readily to obtain a spring having desired strength by quenching and tempering. Typically, by adjusting the silicon to a mass percentage of not less than 2.1% and not more than 2.4%, it is possible readily to obtain a spring having a Rockwell hardness of approximately HRC 53 to HRC 56. If the amount of silicon in the steel material is less than 2.1%, carbide material of a large size in the tempered martensite is liable to precipitate, as a result of which, it is difficult to obtain a spring having high corrosion fatigue strength, while maintaining high strength (HRC 53 to HRC 56). If the amount of silicon in the steel exceeds 2.4%, then decarburization is liable to occur when the spring steel is rolled. As a result of this, there are cases where it is difficult to obtain a spring having high corrosion fatigue strength, while maintaining high strength. From the viewpoint of readily achieving both high strength and high corrosion fatigue strength simultaneously, preferably, the amount of silicon contained in the steel material from which the spring is made is not less than 2.1% and not more than 2.4%. More preferably, the amount of silicon is not less than 2.2% and not more than 2.4%.

The spring disclosed in the present embodiment may satisfy only the conditions relating to the dislocation density and the prior austenite grain size, but preferably also satisfies the aforementioned range in relation to the amount of silicon. By satisfying the range of the amount of silicon described above, it is possible to readily obtain a spring having excellent strength and corrosion fatigue strength.

The carbides contained in the steel material from which the spring is made will now be described. If carbon steel is cooled rapidly from austenite, it is transformed into martensite. By then heating the carbon steel to a prescribed temperature, tempered martensite is obtained. The tempered martensite includes carbides. In steel used to manufacture a spring (called "spring steel" below), the size of the carbides in the tempered martensite affects the strength and the corrosion fatigue strength. Preferably, the carbides contained in the tempered martensite are adjusted in such a manner that the number of carbides having a minimum length less than 15 nm is not less than 40% of the total number of carbides. If the number of small-sized carbides having a minimum length less than 15 nm increases, then the number of coarse carbides having a minimum length of 15 nm or larger decreases relatively. In the description given below, the carbides having a minimum length less than 15 nm are called "small carbides" and the carbides having a minimum length equal to or greater than 15 nm are called "coarse carbides".

By decreasing the ratio of the coarse carbides contained in the tempered martensite, it is possible to obtain spring steel having excellent corrosion fatigue strength while also maintaining good strength. If a spring is manufactured by using this spring steel, it is possible to obtain a spring having good corrosion fatigue strength while achieving strength of HRC 53 to HRC 56. The ratio of the small carbides contained in the tempered martensite is preferably not less than 50% of the total number of carbides, and more preferably not less than 60% of the total number of carbides.

The spring steel (or the spring) may contain, by mass percentage, not less than 0.35% and not more than 0.55% of carbon (C), not less than 0.20% and not more than 1.50% of manganese (Mn), and not less than 0.10% and not more than 1.50% of chromium (Cr).

Preferably, the spring steel contains not less than 0.35% and not more than 0.55% of carbon, by mass percentage. If the spring steel contains carbon in this range, then a spring which has high strength can readily be obtained by quenching and tempering. If the amount of carbon is less than 0.35%, then a high strength cannot be obtained readily by quenching and tempering. Furthermore, if the amount of carbon exceeds 0.55%, there is a risk of decline in the toughness of the spring steel. As a result of this, there is a risk of quenching cracks occurring in the water quenching step of the spring steel manufacturing process. Furthermore, if the amount of carbon exceeds 0.55%, there is a risk of decline in the corrosion fatigue strength of the spring. From the viewpoint of readily achieving high corrosion fatigue strength, although the other alloy components are influential, it is desirable for the amount of carbon contained in the spring steel to be not less than 0.45% and not more than 0.50%. If the amount of carbon is in this range, then good strength can be achieved readily, and a spring having good corrosion fatigue strength can also be obtained readily in relation to other alloy components. More preferably, the upper limit of the amount of carbon is 0.49%, and more preferably, 0.48%. Moreover, the lower limit of the amount of carbon is preferably 0.46% and more preferably 0.47%.

Preferably, the spring steel contains not less than 0.20% and not more than 1.50% of manganese, by mass percentage. If the spring steel contains manganese in this range, a spring having high corrosion fatigue strength can be obtained readily. If the amount of manganese exceeds 1.50%, there is a tendency for the corrosion fatigue strength of the spring to decline, and if the amount of manganese is less than 0.20%, then there is a tendency for the spring strength and hardenability to be insufficient. Moreover, if the amount of manganese is outside a range of not less than 0.20% and not more than 1.50%, there is a tendency for the steel to crack readily during a rolling step in the spring steel manufacturing process. More preferably, the upper limit of the amount of manganese contained in the spring steel is 0.70%, and even more preferably, 0.45%. Furthermore, more preferably, the lower limit of the amount of manganese contained in the spring steel is 0.40%.

Preferably, the spring steel contains not less than 0.10% and not more than 1.50% of chromium, by mass percentage. If the spring steel contains chromium in this range, a spring of high strength can be obtained readily, and hardenability can also be improved. If the amount of chromium is less than 0.10%, then the beneficial effects described above cannot be achieved readily. If the amount of chromium exceeds 1.50%, then the structure of the steel material after tempering is liable to become non-uniform, and there is a risk of decline in the setting resistance of the spring. More preferably, the upper limit of the amount of chromium contained in the spring steel is 0.30%. Furthermore, the lower limit of the amount of carbon contained in the spring steel is more preferably 0.15%, and especially preferably, not less than 0.25%.

The spring steel may include one or two or more elements selected from nickel (Ni), molybdenum (Mo) and vanadium (V), of which the mass percentage is not less than 0.40% and not more than 3.00% in the case of nickel, not less than 0.05% and not more than 0.50% in the case of molybdenum, and not less than 0.05% and not more than 0.50% in the case of vanadium. Consequently, a spring having good toughness is achieved, as well as obtaining high corrosion fatigue strength. Preferably, the spring steel includes all of the elements, nickel, molybdenum and vanadium, in the concentrations stated above.

Preferably, the nickel contained in the spring steel is not less than 0.40% and not more than 3.00%, by mass percentage. If the spring steel contains nickel in this range, then it is possible to improve the corrosion resistance of the spring. In other words, if the spring steel contains nickel in the range stated above, then it is possible to obtain a spring that is not liable to rusting. If the amount of nickel is less than 0.40%, then the beneficial effects of making the spring not liable to rusting are not sufficient. Furthermore, if the amount of nickel exceeds 3.00%, then the beneficial effect of improving the corrosion resistance of the spring tends to become saturated. In other words, up to an amount of nickel of 3.00%, the corrosion resistance of the spring increases as the amount of nickel increases. However, when the amount of nickel exceeds 3.00%, then even if the amount of nickel is increased, the corrosion resistance of the spring is virtually the same as when the amount of nickel is 3.00%. Consequently, it is preferable for the amount of nickel contained in the spring steel to be not more than 3.00%, in view of other characteristics. More preferably, the upper limit of the amount of nickel is 1.00%, and even more preferably, 0.55%. Furthermore, more preferably, the lower limit of the amount of nickel contained in the spring steel is 0.50%. Preferably, the spring steel contains at least nickel, of the nickel, molybdenum and vanadium described above.

Preferably, the molybdenum contained in the spring steel is not less than 0.05% and not more than 0.50%, by mass percentage. If the spring steel contains molybdenum in this range, then it is possible to further improve the corrosion fatigue strength of the spring. If the amount of molybdenum is less than 0.05%, then it is not possible to sufficiently obtain a beneficial effect of improving the corrosion fatigue strength of the spring. If the amount of molybdenum exceeds 0.50%, then the beneficial effect of improving the corrosion fatigue strength of the spring tends to become saturated. Consequently, it is desirable for the amount of molybdenum contained in the spring steel to be not more than 0.50%, in view of other characteristics. The amount of molybdenum is preferably not more than 0.20%, and especially preferably, not more than 0.10%.

Preferably, the vanadium contained in the spring steel is not less than 0.05% and not more than 0.50%, by mass percentage. If the vanadium contained in the spring steel is in this range, then the crystals of the spring steel are readily made fine. More specifically, if the spring steel contains vanadium in the range stated above, the prior austenite grain size number can readily be made larger (the prior austenite grain size can readily be made smaller). If the amount of vanadium is less than 0.05%, then it is not possible to sufficiently obtain a beneficial effect of achieving fine crystals of the spring steel. If the amount of vanadium exceeds 0.50%, then the toughness of the spring is liable to decline. Furthermore, if the amount of vanadium exceeds 0.50%, then corrosion pits are liable to form in the surface of the spring, and there is a risk that these corrosion pits may give rise to fractures and breaks. If corrosion pits are liable to be formed, then this means that the durability of the spring is liable to decline. The amount of vanadium contained in the spring steel is more preferably not more than 0.15%, and even more preferably, not more than 0.10%.

The spring steel may contain phosphorus (P). However, phosphorus tends to weaken the crystal interfaces in the spring steel. Therefore, the phosphorus contained in the spring steel is preferably not more than 0.010% and more preferably not more than 0.005%, by mass percentage.

The spring steel may contain sulfur (S). Similarly to phosphorus, sulfur tends to weaken the crystal interfaces of the spring steel, and therefore, the sulfur contained in the spring steel is preferably not more than 0.010% and more preferably not more than 0.005%, by mass percentage.

The spring steel may contain copper (Cu). The copper contained in the spring steel is preferably not more than 0.25%, and more preferably not more than 0.01%, by mass percentage.

Apart from the alloy components described above, the spring steel can contain titanium (Ti; preferably not less than 0.005% and not more than 0.030%, by mass percentage). Furthermore, the spring steel can also contain boron (B; preferably, not less than 0.0015% and not more than 0.0025%, by mass percentage). The spring steel contains unavoidable impurities in addition to the alloy components described above, and the remainder is iron (Fe).

Here, a manufacturing method of a spring will now be described. A spring can be manufactured from spring steel by using a commonly known hot forming method, cold forming method or warm forming method. Below, a method of manufacturing a coil-shaped spring will be described. Firstly, the spring steel is processed into steel bar, wire rod or wire, or into steel plate. The spring steel is then formed into a coil shape. Thereupon, the spring steel which has been formed into a coil shape is subjected to a warm shot peening process. A spring can then be manufactured by subjecting the coil-shaped spring steel to hot setting. It is also possible to carry out steps such as heat treatment, cold shot peening, cold setting, and the like, between the respective steps described above. A coil for an automobile suspension, for example, can be manufactured by the method of manufacture described above.

The coil forming step may be carried out in a hot state (at a temperature equal to or greater than the temperature at which the spring steel recrystallizes), or in a warm state (at a temperature less than the temperature at which the spring steel recrystallizes), or in a cold state (typically, at room temperature). Furthermore, various commonly known methods can be used to form the spring steel in a coil shape. For example, it is also possible to form the spring steel into a coil shape by using a coiling machine, or to form the spring steel into a coil shape by a method of winding about a metal core.

A heat treatment step is carried out after the coil forming step. The heat treatment step is carried out by different methods, depending on whether the coil forming step has been carried out in a hot state, or in a warm or cold state. If the coil forming step has been carried out in a hot state, then in the heat treatment step, the spring steel that has been formed into a coil shape is subjected to quenching and tempering. Strength and toughness are imparted to the coil by the quenching and tempering process. If the coil forming step is carried out in a cold state, then the spring steel that has been formed into a coil shape is subjected to low-temperature annealing. By carrying out low-temperature annealing, it is possible to eliminate residual stress in the interior and the surface of the coil (typically, tensile residual stress). Various commonly known methods can be used to carry out the quenching and tempering of the coil and the low-temperature annealing of the coil.

The warm shot peening step involves subjecting the coil, which has undergone the heat treatment described above, to shot peening in a hot state. A large compressive residual stress is imparted to the coil surface by the warm shot peening. Therefore, the durability and the corrosion fatigue strength of the coil (the coil-shaped spring) improve. Here, the temperature at which shot peening is carried out can be set appropriately in a temperature range of higher than room temperature and no higher than the recrystallization temperature of wire rod. For example, it is possible to set the coil temperature to not less than 150° C. and not more than 400° C., approximately. Various commonly known methods can be used as a steel ball shot method.

The hot setting step is carried out while the coil temperature is warm. By carrying out hot setting, a compressive residual stress having directionality is imparted to the coil. Consequently, the durability of the coil is improved. Furthermore, by carrying out hot setting, the coil passes the elastic limit and plastic deformation occurs in the coil. Consequently, the setting resistance of the coil is improved. The temperature at which hot setting is carried out can be set appropriately in a temperature range higher than room temperature and less than the temperature at which the spring steel recrystallizes. For instance, hot setting can be carried out in a temperature range of not less than 150° C. and not more than 400° C. By carrying out hot setting in a temperature range of this kind, it is possible to increase the amount of plastic deformation that occurs in the coil, and it is possible to improve the setting resistance of the coil. Hot setting can be carried out by using various commonly known methods. In the case of a coil spring for an automobile suspension, for example, a measure of setting δh of the setting can be specified appropriately in accordance with the total length L of the coil spring for the automobile suspension (or the total length Ls when the coil spring is installed).

The cold shot peening step is carried out when the coil temperature is normal. It is possible to further improve the durability of the coil by carrying out cold shot peening in addition to the warm shot peening described above. The diameter of the steel balls which are used in the cold shot peening is preferably smaller than the diameter of the steel balls which are used in the warm shot peening. For example, if the diameter of the steel balls used in the warm shot peening is 1.2 mm, then the diameter of the steel balls used in the cold shot peening is set to 0.8 mm. By carrying out warm shot peening and cold shot peening, a large compressive residual stress is imparted to the coil by the warm shot peening that is carried out first, and the surface roughness of the coil is improved by the cold shot peening that is carried out subsequently, whereby the durability and the corrosion fatigue strength, and the like, of the coil are further improved. Various commonly known methods can be used as a steel ball shot method.

The cold setting step is carried out while the coil temperature is normal. By carrying out cold setting in addition to the hot setting described above, it is possible further to improve the setting resistance of the coil. In the case of a coil spring for an automobile suspension, for example, a measure of setting δc of the cold setting can be specified appropriately in accordance with the total length L of the coil spring for the automobile suspension (the total length Ls when the coil spring is installed). The setting δc of the cold setting is preferably smaller than the setting δh of the warm setting.

Hot setting may be carried out after the spring steel has been formed into a coil shape, and warm shot peening may be carried out subsequently. Furthermore, it is also possible to omit the cold shot peening step and the cold setting step described above, and to carry out the warm shot peening step and the hot setting step only. Moreover, it is also possible to include other steps, apart from those described above. For example, it is possible to carry out a step of cooling the spring steel in water after hot setting.

As described above, according to the technology disclosed in the present specification, it is possible to obtain a spring having high strength and excellent durability, such as excellent corrosion fatigue strength. These springs can be suitably used for coil springs, leaf springs, torsion bar springs, stabilizer bars, and the like, which are used in a vehicle suspension apparatus, and the like.

EXAMPLES

Examples are described below. The examples given below are concrete examples for describing the present invention, and do not limit the present invention.

Spring steel was manufactured by taking two tons of the steel according to the examples and comparative examples having the chemical compositions shown in Table 1 below, melting in a vacuum melting furnace, blooming and then rolling into wire rod.

TABLE 1

| | | | | | | | | | | | | | mass % |
|---|---|---|---|---|---|---|---|---|---|---|---|---|---|
| | C | Si | Mn | P | S | Ni | Cu | Cr | Mo | V | Ti | B | Nb |
| 1st example | 0.48 | 2.40 | 0.45 | 0.004 | 0.004 | 0.53 | 0.01 | 0.28 | 0.09 | 0.10 | 0.024 | 0.0020 | 0 |
| 2nd example | 0.47 | 2.18 | 0.44 | 0.004 | 0.004 | 0.53 | 0.01 | 0.29 | 0.09 | 0.10 | 0.023 | 0.0021 | 0 |
| 3rd example | 0.46 | 2.17 | 0.69 | 0.005 | 0.007 | 0.27 | 0.01 | 0.19 | 0.08 | 0.09 | 0.024 | 0.0021 | 0 |
| 1st comparative example | 0.48 | 1.80 | 0.70 | 0.006 | 0.004 | 0.27 | 0.01 | 0.19 | 0.10 | 0.08 | 0.018 | 0.0017 | 0 |
| 2nd comparative example | 0.47 | 2.18 | 0.77 | 0.010 | 0.002 | 0.97 | 0.26 | 0.36 | 0.00 | 0.20 | 0 | 0.0020 | 0.030 |
| 3rd comparative example | 0.49 | 1.98 | 0.72 | 0.007 | 0.006 | 0.51 | 0.01 | 0.17 | 0 | 0.19 | 0.021 | 0.0022 | 0 |

The prior austenite grain size, the dislocation density and the small carbide ratio of the wire rods of spring steel having the chemical compositions shown in Table 1 were measured. Firstly, the method of manufacturing a sample used in this measurement will be described. Wire rod of spring steel was surface polished and then heated, and subsequently formed into a coil in a hot state, and then further quenched and tempered to obtain a spring. This spring was taken as a sample for measurement. The heating conditions for the wire rod were set to a high-frequency induction heating temperature of 990° C., and the tempering conditions were adjusted to achieve a spring hardness (after tempering) of HRC 55. Table 2 given below shows a summary of the spring thus obtained. Furthermore, the steel in examples 1 to 3 and comparative example 2 was also used to manufacture springs having a spring hardness of HRC 53, by adjusting the tempering conditions.

TABLE 2

| Spring shape | Wire diameter (mm) | Coil average diameter (mm) | Free length (mm) | Effective no. of turns (turns) | Spring constant (N/mm) |
|---|---|---|---|---|---|
| Cylindrical | φ12.4 | φ110.9 | 323.0 | 4.05 | 39.1 |

The method for measuring the prior austenite grain size will now be described. The prior austenite grain size was calculated on the basis of JIS G0551, using a spring having HRC55 obtained by the method of manufacture described above. The results of this are shown in Table 3.

TABLE 3

| | prior austenite grain size | dislocation density | | ratio of the small carbides | corrosion durability repetition |
|---|---|---|---|---|---|
| | number | HRC55 | HRC53 | (%) | number |
| 1st example | 11.2 | 1.1E+12 | 8.2E+11 | 68.3 | 59021 |
| 2nd example | 11.0 | 1.0E+12 | 7.3E+11 | 55.4 | 49493 |
| 3rd example | 10.4 | 1.0E+12 | 7.3E+11 | 52.4 | 41307 |
| 1st comparative example | 9.8 | 9.7E+11 | | 25.8 | 26538 |
| 2nd comparative example | 9.7 | 1.0E+11 | | | 31636 |
| 3rd comparative example | 11.6 | 9.9E+10 | | | 35813 |

Next, the method of measuring the dislocation density will be described. The dislocation density was found by creating a measurement sample using a spring having HRC 55, similarly to the prior austenite grain size. Firstly, a portion of the spring was cut out in a plane perpendicular to the lengthwise direction. Thereupon, the surfaces thereof were polished to a minor finish, and then subjected to electro-polishing using an aqueous ammonium chloride solution, to create a measurement sample. The sample thus obtained was used to carry out an X-ray diffraction measurement in the central portion of the lateral cross-section which had been electro-polished. Table 4 shows the conditions of the X-ray diffraction measurement.

TABLE 4

| Characteristic X-ray | Cr—Kα |
|---|---|
| Tube voltage, kV | 40 |
| Tube current, mA | 30 |
| Diffraction plane | Fe 211 |
| Diffraction angle, 2θ, deg | 156.4 |
| Scanning range, deg | 146.11~165.91 |
| Step width, deg | 0.03 |
| Incident time, sec | 150 |
| Incident angle, deg | 0 |

After carrying out the X-ray diffraction measurement, the background and the Kα2 component were removed from the measurement profile. The background was removed at 5 points at either end, using the Sonnevelt method. Furthermore, the Kα2 component was removed at an intensity ratio of 0.50, using the Rachinger method.

Figure 1:
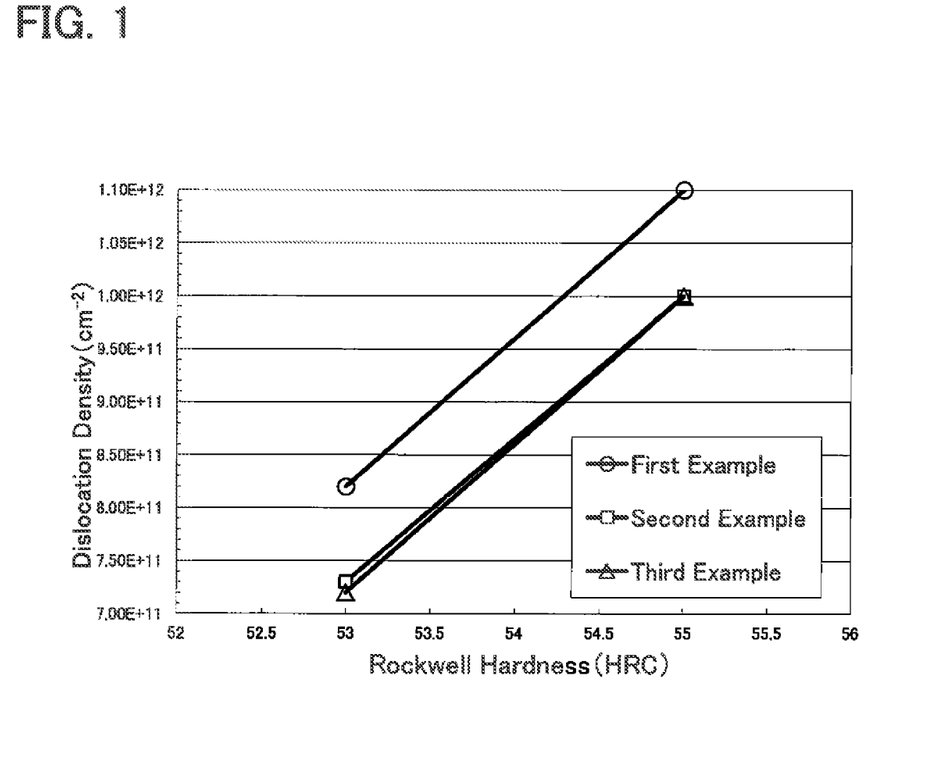
FIG. 1 shows a relationship between the Rockwell hardness and dislocation density of a spring.

The dislocation density (ρ) of the spring was calculated by using a pseudo Voigt function on the diffraction profile after removing the background and the Kα2 component. The results of the dislocation density are shown in Table 3. In the examples 1 to 3, the dislocation density was calculated for a spring which had been adjusted to HRC 53. The relationship between the spring hardness (HRC) and the dislocation density (cm$^{-2}$) is shown in FIG. 1.

The method of calculating the dislocation density using a pseudo Voigt function is disclosed, for example, in "Hoshakou ni yoru ouryoku to hizumi no hyouka," ("*Evaluation of stress and distortion caused by radiated light*"), published by Yokendo. There follows a brief description of a method of calculating the dislocation density using a pseudo Voigt function. The dislocation density is found by approximating the diffraction profile with a pseudo Voigt function, calculating the grain size and distortion, and using Equation 1 below to calculate the dislocation density from the obtained grain size and distortion. In Equation 1, d represents the particle size, $\epsilon$ represents the distortion, and b represents Burger's vector.

$$\rho = \frac{6\varepsilon}{\sqrt{2\pi}\, db} \qquad \text{[Equation 1]}$$

The reason that the grain size and distortion can be calculated from a pseudo Voigt function is that the broadening of the diffraction profile caused by distortion can be approximated by a Gaussian function, and the broadening caused by the grain size can be approximated by a Cauchy function. The pseudo Voigt function can be represented by Equation 2 below. In Equation 2, $I_G(2\theta)$ represents a Gaussian function, $I_C(2\theta)$ represents a Cauchy function, and $\eta$ represents a Gaussian distribution.

$$I(2\theta) = \eta I_G(2\theta) + (1-\eta) I_C(2\theta) \qquad \text{[Equation 2]}$$

The Gaussian function $I_G(2\theta)$ can be represented by Equation 3 below. In Equation 3, J represents the integral intensity, $2\theta$ represents the angle of diffraction, $2\theta_0$ represents the peak position, and B represents the half width.

$$I_G(2\theta) = \frac{2J}{B}\sqrt{\frac{\ln 2}{\pi}} \exp\left\{-4(\ln 2)\left(\frac{2\theta - 2\theta_0}{B}\right)^2\right\} \qquad \text{[Equation 3]}$$

From Equation 3 given above, the peak intensity is represented by Equation 4 below, and the relationship between the integrated value $\beta$ and the half width B is as indicated in Equation 5 below.

$$I_{max} = \frac{2J}{B}\sqrt{\frac{\ln 2}{\pi}} \qquad \text{[Equation 4]}$$

$$\beta = \frac{B}{2}\sqrt{\frac{\pi}{\ln 2}} = 1.06 B \qquad \text{[Equation 5]}$$

Furthermore, the Cauchy function $I_c(2\theta)$ can be represented by Equation 6 below.

$$I_c(2\theta) = \frac{2J}{\pi B}\left\{1 + \frac{4}{B^2}(2\theta - 2\theta_0)^2\right\}^{-1} \qquad \text{[Equation 6]}$$

From Equation 6 given above, the peak intensity is represented by Equation 7 below, and the relationship between the integrated value $\beta$ and the half width B is as indicated in Equation 8 below.

$$I_{max} = \frac{2J}{B} \qquad \text{[Equation 7]}$$

$$\beta = (\pi/2) B \qquad \text{[Equation 8]}$$

As described above, in the pseudo Voigt function, the broadening of the diffraction profile due to distortion can be approximated by a Gaussian function and the broadening due to the grain size can be approximated by a Cauchy function. Consequently, if the integral width of the Gaussian function is $\beta G$ and the integral width of the Cauchy function is $\beta c$, then the distortion $\epsilon$ and the grain size d are respectively represented by Equations 9 and 10.

$$\varepsilon = \frac{\beta_G}{2\tan\theta_0} \qquad \text{[Equation 9]}$$

$$d = \frac{\lambda}{\beta_c \cos\theta_0} \qquad \text{[Equation 10]}$$

By substituting Equation 9 and Equation 10 into Equation 1, it is possible to calculate the dislocation density.

Next, the method of measuring the ratio of small carbides contained in the spring will be described. Firstly, the method of creating a measurement sample is described. The sample used for measuring the small carbide ratio was created by cutting out a 10×5×3 to 5 mm portion of the spring, polishing the cut surfaces to a mirror finish, and then electro-polishing with an electrolyte solution. The electro-polishing solution used when creating a sample for measuring the small carbide ratio was obtained by mixing 8 vol % of perchloric acid, 10 vol % of butoxyethanol, 70 vol % of ethanol and 12 vol % of distilled water.

The electro-polished cross-sectional surface of the sample thus obtained was observed with a field emission—scanning electron microscope (FE-SEM). This observation was made at 25,000 times magnification, in a general portion of the electro-polished surface. Thereupon, photographs of the observed portion were taken at three locations, and the carbides were identified in the photographs. The photographs were also taken at a magnification of 25,000 times. Furthermore, the size of the photograph was 5.13×3.82 μm.

Figure 2:
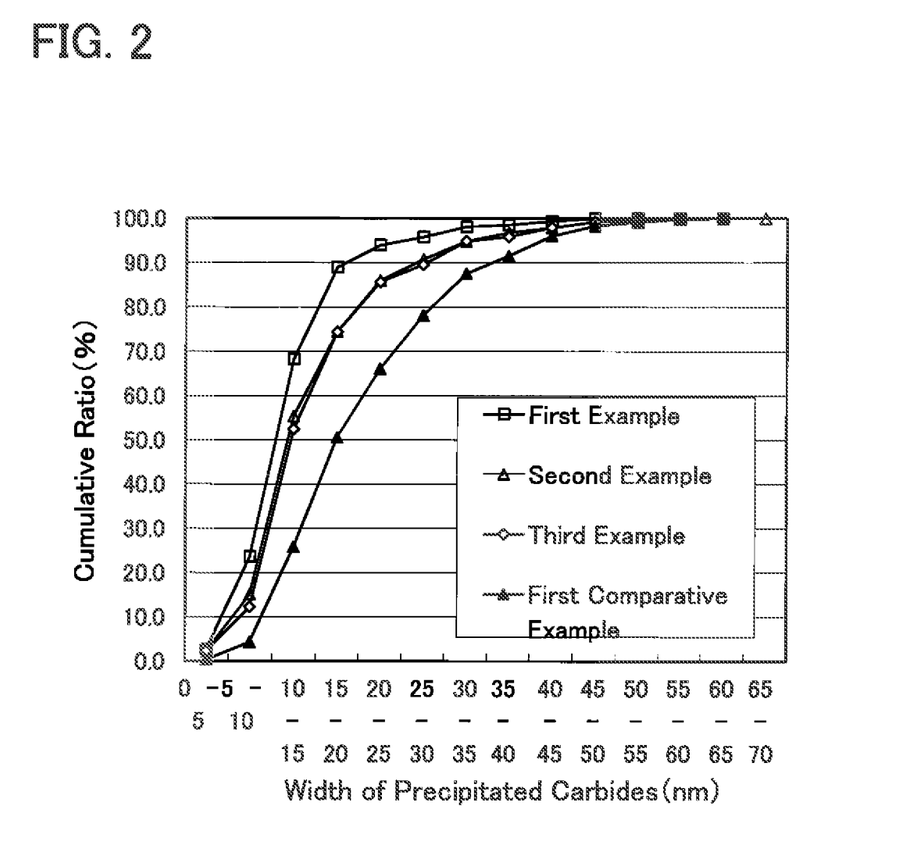
FIG. 2 shows the relationship between the size of the carbides and the cumulative ratio with respect to the total number of carbides.

Of all of the identified carbides, the minimum length of the carbides, in other words, the width of the carbides, was measured and the size of the carbides was identified. Thereupon, the number of carbides was measured for each interval of 5 nm, and the number of carbides of each size was divided by the total number of carbides, to calculate the ratio per size with respect to the total number of carbides. FIG. 2 shows the relationship between the size of the carbides and the cumulative ratio with respect to the total number of carbides. The horizontal axis of the graph represents the size of the carbides (nm) and the vertical axis represents the cumulative ratio (%) with respect to the total number of carbides. FIG. 2 shows the cumulative ratios for samples according to examples 1 to 3 and comparative example 1. Furthermore, Table 3 shows the ratio of carbides having a carbide size of not more than 15 nm (small carbides), for the samples according to examples 1 to 3 and comparative example 1.

The method used in the corrosion fatigue test will now be described. The corrosion fatigue test involved artificially imparting a pit to the spring obtained by the method of manufacture described above and then performing a fatigue test (JASOC604) in a corrosive environment. The pit was imparted at a location where the main stress amplitude of the spring is a maximum (3.1 turns from the end of the coil). A mask with a small hole therein was laid on the outer surface of the spring at the location described above, and a hemispherical hole (artificial pit) having a diameter of 600 μm and a depth of 300 μm was imparted by electro-polishing. The stress concentration factor of the perpendicular stress (main stress) under twisting load due to this pit was 2.2, based on a finite element analysis. The electrolyte solution employed when applying a pit was an aqueous solution of ammonium chloride. The corrosive environment was a state where the artificial pit section only was corroded for 16 hours by a spraying apparatus, using a 5% aqueous NaCl solution as a corrosive solution, whereupon the periphery of the artificial pit section was covered with cotton wool impregnated with a 5% aqueous NaCl solution and drying was prevented by wrapping the periphery with polythene wrap.

The corrosion fatigue test was carried out repeatedly on the sample described above, and the number of repetitions until breaking of the sample (hereinafter, called the corrosion durability repetition number) was evaluated. The repeat corrosion fatigue test ran at a repetition rate of 2 Hz and applied parallel compression using a flat seating. The test height in the repeat corrosion fatigue test was set to conditions by which the main stress was 507±196 MPa in a state without an artificial pit at the artificial pit application position (height 220 mm at maximum load (4031N) and height 270 mm at minimum load (2079N)). Table 3 shows the combined results of the repeat corrosion fatigue test (corrosion durability repetition number). Table 5 shows results for the samples according to examples 1 to 3 and comparative examples 1 to 3, classified on the basis of the numerical value of the dislocation density and the prior austenite grain size number. The dislocation density shown in Table 5 is a value when the Rockwell hardness is HRC 55.

TABLE 5

| | | dislocation density at HRC55 | |
| --- | --- | --- | --- |
| | | less than $1.0 \times 10^{12}$ cm$^{-2}$ | not less than $1.0 \times 10^{12}$ cm$^{-2}$ |
| prior austenite grain size number | less than No. 10 | 1st comparative example | 3rd comparative example |
| | not less than No. 10 | 2nd comparative example | 1st to 3rd example |

As shown in Table 3, examples 1 to 3 all have a higher corrosion durability repetition number than comparative examples 1 to 3. In each of examples 1 to 3, the corrosion durability repetition number exceeds 40,000 times. As shown in Table 5, in the sample (comparative example 1) having a dislocation density less than $1.0 \times 10^{12}$ cm$^{-2}$ and a prior austenite grain size number less than No. 10, the corrosion durability repetition number was the lowest. In another sample (comparative example 2) having a prior austenite grain size number less than No. 10, even though the dislocation density was not less than $1.0 \times 10^{12}$ cm$^{-2}$, the corrosion durability repetition number did not exceed 40,000 times. Furthermore, in the sample (comparative example 3) having a dislocation density less than $1.0 \times 10^{12}$ cm$^{-2}$, even though the prior austenite grain size number was not less than No. 10, the corrosion durability repetition number did not exceed 40,000 times. As shown in Table 5, the corrosion durability repetition number exceeds 40,000 times, if the dislocation density at a Rockwell hardness of HRC 55 is not less than $1.0 \times 10^{12}$ cm$^{-2}$ cm and if the prior austenite grain size number is not less than No. 10.

As shown in FIG. 1, regardless of the composition of the spring, the larger the Rockwell hardness value, the higher the dislocation density tends to become. Furthermore, the gradient of the graph is substantially uniform. Therefore, even if the Rockwell hardness of the spring is not HRC 55, it is possible to calculate the dislocation density when the Rockwell hardness is HRC 55. The straight line relating to example 3 in FIG. 1 represents $\rho = 1.4 \times 10^{11} \times H - 6.7 \times 10^{12}$, when the dislocation density is taken to be $\rho$ and the Rockwell hardness is taken to be H. As shown in Table 3, the spring according to example 3 had a dislocation density of $1.0 \times 10^{12}$ cm$^{-2}$ when the Rockwell hardness is HRC 55. The straight line positioned above the straight line relating to example 3 shows a dislocation density of $1.0 \times 10^{12}$ cm$^{-2}$ or more at a Rockwell hardness of HRC 55, as in examples 1 and 2 in FIG. 1. In other words, if Formula (1) below is satisfied, the dislocation density at a Rockwell hardness of HRC 55 is not less than $1.0 \times 10^{12}$ cm$^{-2}$.

$$\rho \geq 1.4 \times 10^{11} \times H - 6.7 \times 10^{12} \quad (1)$$

As shown in Table 3 and FIG. 2, examples 1 to 3 each have characteristics whereby the cumulative ratio of small carbides is not less than 40%. More specifically, the cumulative ratio of the small carbides in examples 1 to 3 exceeds 50%. The greater the ratio of the small carbides, the higher the level of the corrosion fatigue strength. Furthermore, examples 1 to 3 each have characteristics whereby the amount of silicon is not less than 2.1% (See Table 1). As Table 1 and Table 3 reveal, the greater the amount of silicon in the spring, the higher the level of the corrosion fatigue strength.

Specific examples of the present invention has been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. A spring, which exhibits:
   a Rockwell hardness of HRC 53 to HRC 56,
   a dislocation density ρ (cm$^{-2}$) that satisfies the following Formula (1) in the Rockwell hardness range of HRC 53 to HRC 56:
   (1) $\rho \geq 1.4 \times 10^{11} \times H - 6.7 \times 10^{12}$, wherein H is the Rockwell hardness; and
   a prior austenite grain size number that is not less than 10.

2. The spring according to claim 1, wherein the spring contains tempered martensite and also contains not less than 2.1% and not more than 2.4% of silicon, by mass percentage.

3. The spring according to claim 2, wherein carbides having a minimum length less than 15 nm are not more than 40% of a total number of carbides contained in the tempered martensite.

4. The spring according to claim 3, containing, by mass percentage, not less than 0.35% and not more than 0.55% of carbon, not less than 0.20% and not more than 1.50% of manganese, and not less than 0.10% and not more than 1.50% of chromium;
   the spring further containing at least one element selected from the group consisting of nickel, molybdenum and vanadium, respective mass percentages being not less than 0.40% and not more than 3.00% in the case of nickel, not less than 0.05% and not more than 0.50% in the case of molybdenum, and not less than 0.05% and not more than 0.50% in the case of vanadium; and the remainder of the spring material consisting of iron and unavoidable impurities.

5. The spring according to claim 4, containing not less than 0.40% and not more than 0.50% of manganese.

6. The spring according to claim 5, containing not less than 0.50% and not more than 0.60% of nickel.

7. The spring according to claim 1, containing, by mass percentage, not less than 0.35% and not more than 0.55% of carbon, not less than 0.20% and not more than 1.50% of manganese, and not less than 0.10% and not more than 1.50% of chromium; and the spring further containing at least one element selected from the group consisting of nickel, molybdenum and vanadium, respective mass percentages being not less than 0.40% and not more than 3.00% in the case of nickel, not less than 0.05% and not more than 0.50% in the case of molybdenum, and not less than 0.05% and not more than 0.50% in the case of vanadium.

8. The spring according to claim 7, containing not less than 0.40% and not more than 0.50% of manganese.

9. The spring according to claim 7, containing not less than 0.50% and not more than 0.60% of nickel.

10. The spring according to claim 7, wherein the spring contains tempered martensite and also contains not less than 2.1% and not more than 2.4% of silicon, by mass percentage.

11. A steel coil spring having the following properties:

a Rockwell hardness of HRC 53 to HRC 56;

a dislocation density $\rho$ (cm$^{-2}$) that satisfies the formula $\rho \geq 1.4 \times 10^{11} \times H - 6.7 \times 10^{12}$ in the Rockwell hardness range of HRC 53 to HRC 56, wherein H is the Rockwell hardness; and a prior austenite grain size number of 10 or higher.

12. The steel coil spring according to claim 11, wherein the spring contains tempered martensite and 2.1 mass % $\leq$ Si $\leq$ 2.4 mass %.

13. The steel coil spring according to claim 12, wherein the spring contains in terms of mass percent:

0.35% $\leq$ C $\leq$ 0.55%;

0.20% $\leq$ Mn $\leq$ 1.50%, and 0.10% $\leq$ Cr $\leq$ 1.50%.

14. The steel coil spring according to claim 13, wherein the spring further contains in terms of mass percent:

0.40% $\leq$ Ni $\leq$ 3.00%;

0.05% $\leq$ Mo $\leq$ 0.50%; and/or 0.05% $\leq$ V $\leq$ 0.50%.

15. The steel coil spring according to claim 14, wherein the spring contains Mn in an amount, in terms of mass percent, of: 0.40% $\leq$ Mn $\leq$ 0.50%.

16. The steel coil spring according to claim 15, wherein the spring contains Ni in an amount, in terms of mass percent, of: 0.50% $\leq$ Ni $\leq$ 0.60%.

17. The steel coil spring according to claim 16, wherein:

the tempered martensite contains a total number of carbides and carbides having a minimum length less than 15 nm is not more than 40% of the total number of carbides contained in tempered martensite.

18. The steel coil spring according to claim 17, wherein the spring contains V in an amount, in terms of mass percent, of: 0.05% $\leq$ V $\leq$ 0.15%.

19. The steel coil spring according to claim 18, wherein the spring contains C in an amount, in terms of mass percent, of: 0.45% $\leq$ C $\leq$ 0.50%.

20. The steel coil spring according to claim 19, wherein the spring contains Cr in an amount, in terms of mass percent, of: 0.15% $\leq$ Cr $\leq$ 0.30%.

* * * * *